United States Patent [19]

Sommer

[11] Patent Number: 5,472,076
[45] Date of Patent: Dec. 5, 1995

[54] DEVICE FOR CHANGING THE POSITION OF A LID

[75] Inventor: Walter Sommer, Essen, Germany

[73] Assignee: Krupp Maschinentechnik Gesellschaft mit beschränkter Haftung, Essen, Germany

[21] Appl. No.: 240,103

[22] Filed: May 9, 1994

[30] Foreign Application Priority Data

May 7, 1993 [DE] Germany .................. 43 15 314.3

[51] Int. Cl.⁶ .................................................. B65G 47/24
[52] U.S. Cl. ........................ 198/412; 198/415; 198/416; 198/625; 198/663
[58] Field of Search ........................ 198/411, 412, 198/415, 416, 625, 663

[56] References Cited

U.S. PATENT DOCUMENTS

| 4,561,534 | 12/1985 | Nalbach . | |
|---|---|---|---|
| 4,760,910 | 8/1988 | Suzuki et al. | 198/412 |
| 5,076,416 | 12/1991 | Spatafora et al. | 198/663 |
| 5,355,991 | 10/1994 | Baranowski | 198/412 |

FOREIGN PATENT DOCUMENTS

| 2510975 | 2/1983 | France . |
|---|---|---|
| 6918419 | 5/1969 | Germany . |
| 1294873 | 5/1969 | Germany . |
| 7827963 | 9/1978 | Germany . |
| 2740921 | 3/1979 | Germany . |
| 3419039 | 6/1985 | Germany . |
| 3525656 | 2/1986 | Germany . |
| 3643329 | 6/1988 | Germany . |
| 3916671 | 12/1989 | Germany . |
| 4028613 | 3/1991 | Germany . |
| 4135515 | 6/1992 | Germany . |
| 1699882 | 12/1991 | U.S.S.R. . |
| 1364730 | 8/1974 | United Kingdom . |
| 2267473 | 12/1993 | United Kingdom . |

*Primary Examiner*—Joseph E. Valenza
*Attorney, Agent, or Firm*—Spencer, Frank & Schneider

[57] ABSTRACT

Two cooperating spiral conveyors are provided between a transport device having a transport plane and a transport segment. The conveyors are driven in opposite directions and are provided with opposite thread directions. The axes of the spiral conveyors are disposed at the height of the transport plane. The pitch and the thread clearance of peripheral recesses of the spiral conveyors decrease continuously from the transport device to the transport segment. A support surface for a lid is disposed between the two spiral conveyors. At the end contiguous to the transport device, the support surface has the same height as the transport plane, and at the end contiguous to the transport segment, its height is lower by half of the lid diameter.

4 Claims, 1 Drawing Sheet

DEVICE FOR CHANGING THE POSITION OF A LID

CROSS REFERENCE TO A RELATED APPLICATION

The present application claims the right of foreign priority with respect to Application No. P 43 15 314.3 filed in Germany on May 7, 1993, the subject matter of which is incorporated herein by reference.

BACKGROUND OF THE INVENTION

1. Field of the Invention

The present invention relates to a device for changing a position of a container lid. More particularly, the present invention relates to a device for changing the position of a container lid during transport from a horizontal position on a transport device into an upright position in a transport segment, or vice versa. The container lids can be in a punched or in a rolled configuration, and can be provided with lugs or screw threads. Blanks serving in the production of container lids can also have their position changed from a horizontal to an upright position. Although lids are typically circular, the present invention is intended to able to change the position of a non-circular lid.

2. Description of the Related Art

During rubberization or lining, that is, the application of a sealant to the inside of a lid, the lid lays on its outside surface on a flat receptacle, i.e., its inside surface, is oriented upwardly. The lid leaves the lining station or machine in this position.

In modern drying furnaces, lids are transported through a drying segment in series in an upright, parallel position, that is, the main plane of the lid is oriented perpendicular to the direction the lids are being transported by a transport segment and thus rotated by 90° with respect to their flat position. The transfer of the lids from their flat position on a transport plane into the upright position which is oriented perpendicular to the plane of the transport plane in the transport segment is referred to as righting.

All previously-known devices for righting can lids halt a lid which is being transported in a horizontal position, more or less abruptly, by using a stop and forcing the lid into a vertical position by using magnet wheels, bristled wheels or free fall, possibly supported by magnetic force, compressed air or vacuum. Risks are high that the mass of the freshly-applied rubber or sealant, due to its viscosity and the sudden stopping and deflection of the lid, shifts on, or even exits the lid.

SUMMARY OF THE INVENTION

It is an object of the invention to provide a device with which container lids can be transferred without impacts or jolts from a horizontal position into an upright or standing position, and vice versa, even with high operational capacities (lids/time unit).

The present invention also provides a device for changing the position of a lid between a horizontal position and an upright position while the lid is being transported between a plane of a transport device and a transport segment. The device includes a first spiral conveyor having a first axis, a first end which is contiguous to the transport device and a second end which is contiguous to the transport segment, a second spiral conveyor having a second axis, a first end which is contiguous to the transport device and a second end which is contiguous to the transport segment, the first and second axes are disposed at a height of the plane of the transport device, the first and second spiral conveyors having opposite thread directions and are driven in opposite directions around their respective axes, each spiral conveyor also includes a peripheral recess, the recesses of both spiral conveyors having a contour at the first end of the spiral conveyors corresponding to the peripheral edge of the lid, the thread clearance of the peripheral recesses of each spiral conveyor is decreasing from the first end to the second end of each respective spiral conveyor, and a support surface for the lid is disposed between the first and second spiral conveyors such that the support surface has a height at the first end of each respective spiral conveyor which is the same as the height of the plane of the transport device and a height of the support surface at the second end of each respective spiral conveyor that is lower than the height of the support surface at the first end of each respective spiral conveyor by half of a diameter of the lid.

Preferably, the pitch of each of the first and second spiral conveyors decreases from their respective first ends to their respective second ends, and the thread clearance of the peripheral recesses at the second end of each respective spiral conveyor corresponds to a thickness of a peripheral edge of the lid. Additionally, the pitch of each respective spiral conveyor corresponds to the stack height of the lid at the second end of each respective spiral conveyor.

For righting, the two spiral conveyors engage lids from the transport device in the transport plane, on which the lids lay flat, and guide them to the transport segment. The lids are carried along in the transport direction and their orientation is changed by the geometric dimensions and the shape of the conveyors. Additionally, the lids are supported from below by a support surface.

When being changed from a flat position into an upright position, the lids are transported in the same direction that they were transported into the conveyors. The lids lay on the transport device with defined spacing, and are engaged by the peripheral recesses of the conveyors. For this purpose, the axes of the spiral conveyors are disposed, at least at the end contiguous to the transport device, at essentially the same height as the transport plane, and the peripheral recesses at this end of the conveyors are provided with a contour corresponding at least to the circumferential shape of the lid. The lids are transported away from the transport device by providing the conveyors each with opposite direction of rotation and by the inward thread direction of the conveyors. The thread clearance, which decreases in the direction toward the transport segment, forces the lids to be righted, i.e., to change from a flat position into an upright position. Because the support surface between the spiral conveyors sinks by half the lid diameter in the same direction that the lids are being transported, the mid-point of the lids can be maintained at a constant height, despite a change in angle of the lid during righting.

The lids are at a constant spacing from one another on the transport device. If the lids are to be assembled in their vertical position into a lid stack, the invention provides that the thread of the spiral conveyors decreases from the end contiguous to the transport device toward the end contiguous to the transport segment.

To give the lids a most upright position, the thread clearance of the peripheral recesses of the spiral conveyors is dimensioned at their end contiguous to the transport segment to correspond to the height of the outer lid edge, or in a rolled lid, the roll height, plus a small amount of play.

In a reverse situation, to be able to reliably engage the lids for horizontal placement when they are transported in an upright lid stack along a transport segment, the thread at the end of the spiral conveyor contiguous to the transport segment is dimensioned to correspond to the height of a lid in the lid stack.

DETAILED DESCRIPTION OF THE PREFERRED EMBODIMENT

Figure 2:
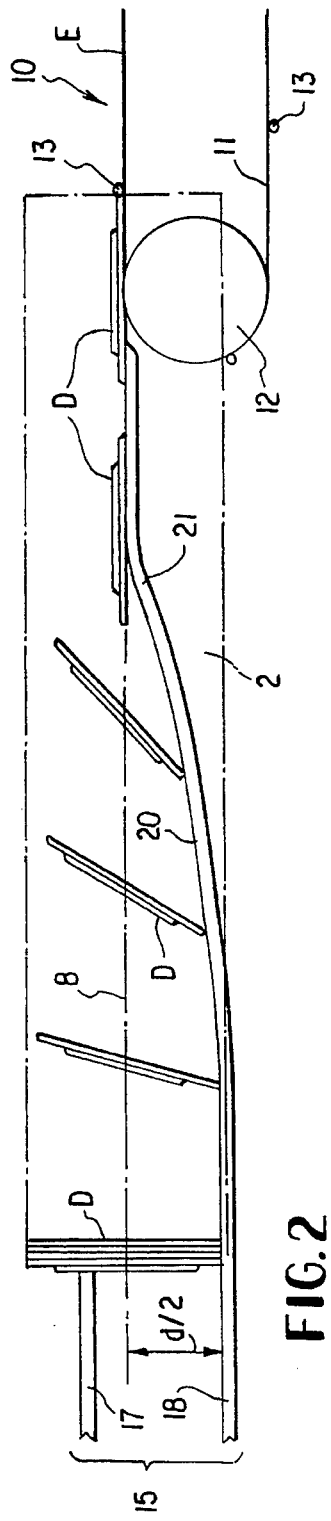
FIG. 2 is a sectional view of the device of the present invention along line II—II in FIG. 1.
Figure 1:
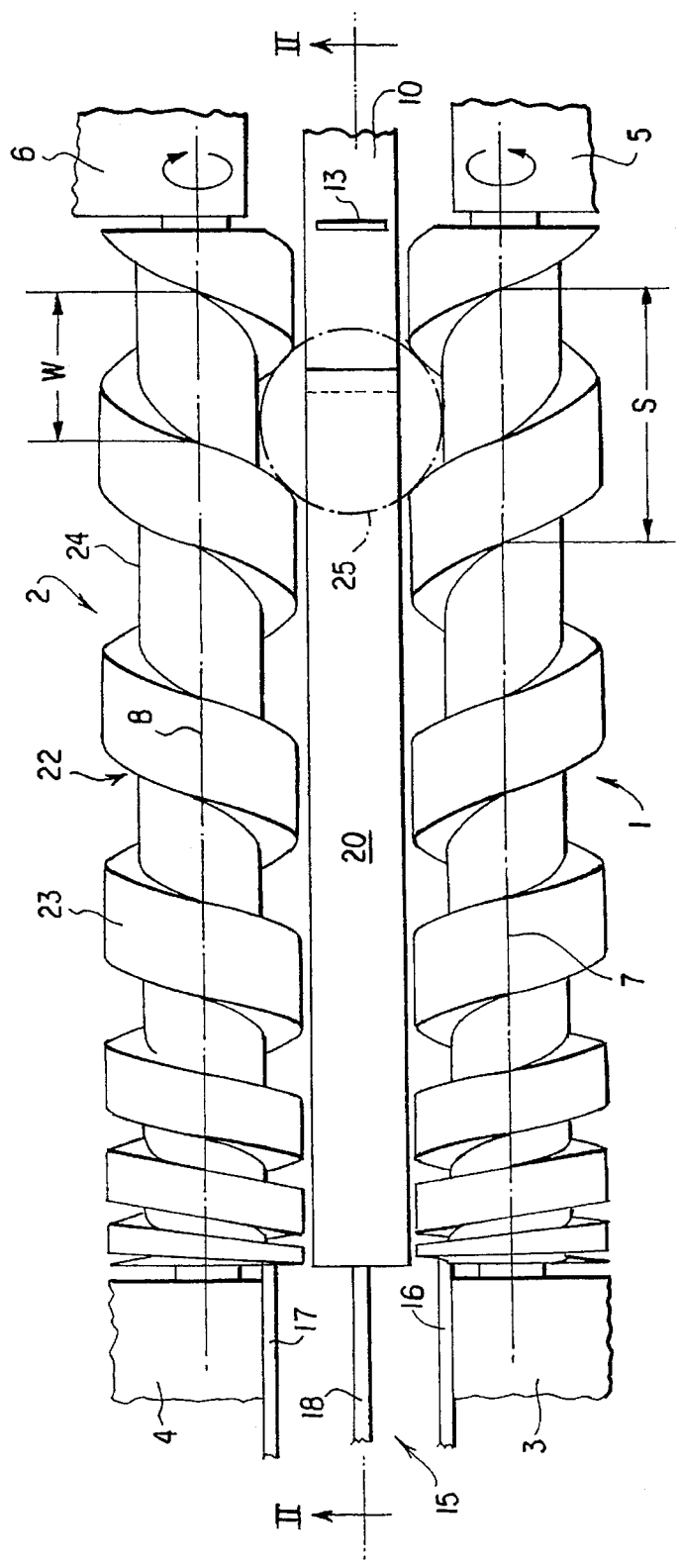
FIG. 1 is a top plan view of a preferred embodiment of the present invention.

The device according to the invention for changing the position of a lid D, shown in FIGS. 1 and 2, has two spiral conveyors 1, 2 (also known as transport worms) that are seated with their ends in bearings 3, 4, 5 and 6 in such a way that their respective axes 7, 8 are parallel to one another and are disposed at the same height. Conveyor 1 has a right thread, and conveyor 2 has a left thread. The two conveyors are driven in opposite directions about their respective axes by a gear connection which is not shown.

A transport device 10, having a conveyor belt or belt band 11, is disposed between bearings 5, 6. Belt 11 encircles an end pulley or deflection roller 12 on one side and, on the other side, an end pulley or deflection roller (not shown) which is remote from conveyors 1, 2. On its outer surface, belt band 11 has carriers 13 which are disposed from one another at a constant spacing that is larger than a lid diameter d.

A transport segment 15 in the form of a guide trough comprising, for example, three parallel, round rods 16, 17, 18, adjoins the conveyors 1, 2 at their end opposite transport device 10. Rod 18 is located centrally between the two conveyors, and by half the lid diameter (d/2) beneath the common height of axes 7, 8. The two other rods 16, 17 are located above the height of axes 7, 8, and are spaced from one another such that they flank a lid D, supported on rod 18, with play.

A support surface 20 formed by either a top side of a thick, smooth piece of sheet metal 21 or by an upper surface of a solid element, is located between deflector roller 12 and guide trough 15. At its end contiguous to deflection roller 12, support surface 20 assumes the height of axes 7, 8 or transport plane E of transport device 10, on which lids D lay. In contrast, at the end contiguous to the guide trough 15, support surface 20 is lowered by half the lid diameter, d/2. Support surface 20 has a continuous changeover between the two ends.

At their ends which are contiguous to transport device 10, spiral conveyors 1, 2 have a large pitch s that continuously decreases in a direction toward transport segment 15. Together with conveyor core 24, peripheral recesses 22 between the webs or the strip-shaped threads 23 of conveyors 1, 2 have such a contour at the end facing transport device 10 that a common, inscribable circle 25 determined by their geometry corresponds, at the height of the transport plane, to the periphery of lids D, including a predetermined amount of play.

When conveyor 2 is rotated to the right and conveyor 1 is rotated to the left, a lid D located at the position of the imaginary inscribed circle 25 is conveyed in the direction toward transport segment 15. The decreasing pitch s and the decreasing thread clearance w of conveyors 1, 2 forces lid D to change its orientation on its way to transport segment 15, as indicated in FIG. 2, and to reduce the spacing between the preceding and following lids. At the end contiguous to transport segment 15, pitch s of the conveyors causes lids D to stand practically vertically to the transport direction. The lids are pressed together by the axial force of spiral conveyors 1, 2 to form a lid stack, and are pushed through transport segment 15 into, for example, a drying furnace.

The device of the present invention can also perform the opposite function of changing an upright position of a lid to a horizontal position. In this case, the direction of rotation is counter to that illustrated in FIG. 1, that is, conveyor 2 rotates—viewed from transport device 10—to the left, and conveyor 1 rotates to the right. In this operating mode, a first lid D of a lid stack located in transport segment 15 is engaged, pulled off the stack and conveyed in the direction toward transport device 10. Lid D achieves an increasing distance from the next lid by the increasing thread of conveyors 1, 2, in conjunction with climbing support surface 20, and has an increasingly flat inclination until the lid finally rests horizontally on transport plane E and is transported away by transport device 10.

The foregoing is a complete description of the present invention. The scope of the invention should only be limited by the following claims.

What is claimed is:

1. A device for changing the position of a lid between a horizontal position and an upright position, or vice versa, while the lid is being transported between a transport device and a transport segment, comprising:

a first spiral conveyor having a first axis, a first end which is contiguous to the transport device and a second end which is contiguous to the transport segment;

a second spiral conveyor having a second axis, a first end which is contiguous to the transport device and a second end which is contiguous to the transport segment;

the first and second axes being disposed at a height of a plane of the transport device;

the first and second spiral conveyors having opposite thread directions and being driven in opposite directions around their respective axes;

each spiral conveyor including a peripheral recess, the recesses of both spiral conveyors having a contour at the first end of the spiral conveyors corresponding to a peripheral edge of the lid, a thread clearance of the peripheral recesses of each spiral conveyor decreasing from the first end to the second end of each respective spiral conveyor; and a support surface for the lid disposed between the first and second spiral conveyors, the support surface having a height at the first end of each respective spiral conveyors which is the same as the height of the plane of the transport device and having a height at the second end of each respective spiral conveyor that is lower than the height of the support surface at the first end of each respective spiral conveyor by half of a diameter of the lid.

2. A device according to claim 1, wherein a pitch of each of the first and second spiral conveyors decreases from their respective first ends to their respective second ends.

3. A device according to claim 1, wherein the thread clearance of the peripheral recesses at the second end of each respective spiral conveyor corresponds to a thickness of the peripheral edge of the lid.

4. A device according to claim 2, wherein the pitch of each respective spiral conveyor corresponds to a stack height of a lid at the second end of each respective spiral conveyor.

* * * * *